(12) United States Patent
Bäuerlein et al.

(10) Patent No.: US 9,190,885 B2
(45) Date of Patent: Nov. 17, 2015

(54) DRIVE DEVICE FOR A MOTOR VEHICLE

(71) Applicant: Siemens Aktiengesellschaft, München (DE)

(72) Inventors: Frank Bäuerlein, Postbauer-Heng (DE); Markus Klöpzig, Ebermannstadt (DE); Klaus Schleicher, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 117 days.

(21) Appl. No.: 13/862,989

(22) Filed: Apr. 15, 2013

(65) Prior Publication Data
US 2013/0274053 A1    Oct. 17, 2013

(30) Foreign Application Priority Data
Apr. 16, 2012   (DE) .................. 10 2012 206 144

(51) Int. Cl.
| B60K 17/16 | (2006.01) |
| H02K 7/116 | (2006.01) |
| H02K 7/14 | (2006.01) |
| F16H 48/06 | (2006.01) |
| B60K 1/00 | (2006.01) |
| F16H 57/02 | (2012.01) |
| F16H 57/037 | (2012.01) |

(52) U.S. Cl.
CPC .. *H02K 7/14* (2013.01); *B60K 1/00* (2013.01); *F16H 48/06* (2013.01); *H02K 7/116* (2013.01); *B60K 2001/001* (2013.01); *F16H 57/037* (2013.01); *F16H 2057/02034* (2013.01)

(58) Field of Classification Search
CPC .................................................. B60K 2001/001
USPC .................................... 475/149, 150; 310/83
See application file for complete search history.

(56) References Cited

U.S. PATENT DOCUMENTS

| 2,653,257 | A | * | 9/1953 | Sailer .............................. 310/166 |
| 4,918,344 | A | * | 4/1990 | Chikamori et al. .............. 310/83 |
| 5,637,048 | A | * | 6/1997 | Maeda et al. ................... 475/150 |
| 5,759,128 | A | * | 6/1998 | Mizutani et al. ............... 475/149 |
| 7,497,286 | B2 | * | 3/2009 | Keller et al. .................. 180/65.6 |
| 7,556,580 | B2 | * | 7/2009 | Saito et al. ..................... 475/154 |
| 7,621,835 | B2 | * | 11/2009 | Oshidari ........................... 475/5 |
| 2012/0124837 | A1 | * | 5/2012 | Palfai et al. ................... 29/893.1 |
| 2012/0129644 | A1 | * | 5/2012 | Palfai et al. ................... 475/150 |
| 2013/0123058 | A1 | * | 5/2013 | Markl ............................ 475/150 |
| 2013/0126669 | A1 | | 5/2013 | Hamann et al. |
| 2014/0031160 | A1 | * | 1/2014 | Suzuki et al. .................. 475/149 |
| 2014/0042796 | A1 | * | 2/2014 | Park et al. ....................... 301/6.5 |

FOREIGN PATENT DOCUMENTS

| DE | 1042077 B | | 10/1958 |
| DE | 10 2005 055 690 | * | 5/2007 |
| DE | 102005055690 A1 | | 5/2007 |

* cited by examiner

*Primary Examiner* — Sherry Estremsky
(74) *Attorney, Agent, or Firm* — Henry M. Feiereisen LLC

(57) ABSTRACT

A drive device for a motor vehicle includes at least one electric machine having at least one rotor element which includes a single-piece, essentially sleeve-shaped rotor carrier to delimit an installation area in a radial direction. At least one transmission device is disposed, at least partly, in the installation area and configured to be driven by the electric machine via the rotor element.

9 Claims, 2 Drawing Sheets

DRIVE DEVICE FOR A MOTOR VEHICLE

CROSS-REFERENCES TO RELATED APPLICATIONS

This application claims the priority of German Patent Application, Serial No. 10 2012 206 144.4, filed Apr. 16, 2012, pursuant to 35 U.S.C. 119(a)-(d), the content of which is incorporated herein by reference in its entirety as if fully set forth herein.

BACKGROUND OF THE INVENTION

The present invention relates to a drive device for a motor vehicle.

The following discussion of related art is provided to assist the reader in understanding the advantages of the invention, and is not to be construed as an admission that this related art is prior art to this invention.

Drive devices for motor vehicles have been described in the prior art and are also known from series production of motor vehicles, especially of automobiles. Typically, a drive device includes a drive unit and if necessary a transmission, via which the motor vehicle is able to be driven. The drive unit involves an internal combustion engine for example. In addition, the drive device can include a transmission device for transmitting or converting torque generated by the drive device. Wheels of the vehicle are driven via the transmission device. Conventional drive devices are bulky and demand much installation space, causing package problems.

It would therefore be desirable and advantageous to provide an improved drive device for a motor vehicle to obviate prior art shortcomings.

SUMMARY OF THE INVENTION

According to one aspect of the present invention, a drive device for a motor vehicle includes at least one electric machine having at least one rotor element which includes a single-piece, essentially sleeve-shaped rotor carrier to delimit an installation area in a radial direction, and at least one transmission device disposed, at least partly, in the installation area and configured to be driven by the electric machine via the rotor element.

In accordance with the present invention, torque provided by the electric machine in its motor mode can be introduced into the transmission device for converting and/or transmitting the torque provided via the rotor element. Through integration, at least in part, of the transmission device into the rotor element, the installation space required for a drive device according to the invention is particularly small, especially in the axial direction of the electric machine. The transmission device does not adjoin the rotor element or the electric machine in the axial direction so that a loss of axial installation space which would result from disposing the transmission device in the axial direction next to the rotor element is avoided.

In addition an especially advantageous guidance of a flow of force and/or torque from the rotor element via the transmission device to driven wheels of the motor vehicle is possible, since the forces and/or torques can be guided directly to the respective axial sides of the electric machine especially at least substantially from the axial center of the rotor element and do not have to be initially routed roughly to one of the axial sides and subsequently to the other axial side.

The rotor element includes a rotor carrier, through which the installation area is at least partly delimited and which is essentially embodied in a sleeve shape and in one piece. As a result of the one-piece configuration of the rotor carrier, space-intensive joints for connecting a number of rotor carrier parts can be avoided. Such joints involve joint flanges for example which are not provided and not necessary in the drive device. This keeps especially the radial installation space requirement of the rotor carrier and thus of the drive device especially small. Furthermore, as a result of its sleeve-shaped configuration, the rotor carrier has a thin-walled and delicate structure which likewise is associated with a small installation space requirement and also with a low weight of the drive device.

Advantageously, the rotor carrier can be manufactured as part of a manufacturing process at least substantially without loss of material. The correspondingly embodied rotor carrier can be used any given embodiment of the electric machine. The electric machine is embodied for example as a synchronous machine, for example a permanently-excited electric machine, or as an asynchronous machine.

The rotor element of the electric machine may include for example at least one so-called active rotor part, which is held on the rotor carrier. Active rotor part is to be understood as a rotor of an electrical machine, i.e. of an electric motor or of the generator. Furthermore the term active rotor part also for example covers a secondary part of a linear motor. Common to active rotor parts in general is for example that they can be manufactured by packaging of metal sheets. The active rotor parts serve in such cases to guide the magnetic flux of the electrical machine and for example include laminated cores and also coils. As an alternative, materials such as soft-magnetic materials, which can for example be injected like plastic, or air core inductors without iron would be other conceivable options for this purpose.

In a motor mode, the electric machine can provide torque which is introduced via the rotor carrier into the transmission device. The electric machine also be operated in a generator mode, so that torque provided by the driven wheels of the motor vehicle is able to be introduced via the transmission device into the electric machine. This enables the electric machine in the generator mode to convert mechanical energy at least partly into electrical energy and thus for example charge an electric storage device with electric current and/or supply at least one other type of electrical load with electric current.

A sleeve-shaped and especially thin-walled configuration of the rotor carrier is also advantageous because it provides an especially large amount of installation space in its interior for arrangement of the transmission device in the installation area.

According to another advantageous feature of the invention, the rotor carrier can be manufactured by an impact extrusion process. Impact extrusion provides a time-saving and cost-efficient manufacturing of the rotor carrier and a realization of an especially small wall thickness of the rotor carrier. The rotor carrier can also be manufactured in another way, if necessary for example by pyrotechnical reshaping by means of an explosion with explosives in a tube.

According to another advantageous feature of the invention, the rotor element and the transmission device can be disposed at least partly coaxially in relation to one another. In other words, at least a number of rotatable transmission elements of the transmission device are disposed coaxially to the rotor element. Thus, the drive device and the rotor element are disposed especially favorably in terms of installation space, which leads to the drive device having a low installation space requirement.

According to another advantageous feature of the invention, the transmission device can include a differential gear. The wheels of the motor vehicle can be driven especially advantageously by the differential gear, since the differential gear allows differences in rotational speed between the wheels and thus between drive shafts coupled to the wheels, which are coupled to the differential gear, without causing stress on the drive device. Such speed differences occur for example when the motor vehicle is negotiating a curve, during which the wheel on the outside of the curve rotates more quickly than the wheel on the inside of the curve.

According to another advantageous feature of the invention, the transmission device can include at least one transmission stage configured to be driven by the electric machine, with the differential gear configured to be driven via the transmission stage and the rotor element by the electric machine. Torque provided by the electric machine can thus be introduced via the rotor carrier into the transmission stage and the differential gear can be driven via the transmission stage and the rotor element of the electric machine. Thus, the transmission stage and the differential gear are connected in series with one another. This arrangement provides especially advantageous transmission ratios, so that the motor vehicle can be driven especially advantageously by the drive device.

According to another advantageous feature of the invention, the transmission stage and the differential gear may at least partly, especially completely, disposed in the installation area. The drive device thus requires very little installation space. It is also conducive to the low installation space requirement for the rotor element and the transmission stage to be disposed coaxially to one another.

To implement advantageous transmission ratios of the transmission device, the transmission device can include a plurality of transmission stages which are all disposed, at least partly, especially completely, in the installation area.

According to another advantageous feature of the invention, the transmission device can include a plurality of transmission stages connected in series with one another to thereby define a first transmission stage and a last transmission stage, with the differential gear, when present, being configured to be driven via the last transmission stage. The differential gear is hereby linked or disposed in series with the transmission stages. Torque provided by the electric machine via its rotor element and especially its rotor carrier can be especially advantageously transmitted and converted in this way.

According to another advantageous feature of the invention, the transmission device can include a first transmission stage configured as a first planetary gear, and a second transmission stages configured as a second planetary gear which is being driven by the first planetary gear and via which the differential gear is being driven. Torque provided by the electric machine can thus first be introduced via the rotor carrier into the first planetary gear. Subsequently, torque is taken off from the first planetary gear and introduced into the second planetary gear, after which the torque from the second planetary gear is taken off and introduced into the differential gear.

Subsequently the torque is conveyed, especially via a respective driveshaft coupled to the differential gear, to the wheels of the motor vehicle. This connection of the planetary gears and the differential gear leads to the realization of especially advantageous transmission ratios. At the same time, the installation space requirement of the drive device can be kept especially small.

According to another advantageous feature of the invention, the first planetary gear can include a sun wheel linked to the rotor carrier of the rotor element, and a planetary carrier linked to a sun wheel of the second planetary gear, with the second planetary gear having a planetary carrier which is linked to the differential gear. The rotor carrier thus functions as a take-off element of the electric machine, via which torque can be taken off from the electric machine. The sun wheel of the first planetary gear functions as an introduction element of the first planetary gear, via which torque can be introduced into the first planetary gear. The first planetary carrier of the first planetary gear represents a redirection element of the first planetary gear via which torque is taken off from the first planetary gear and conveyed to the second planetary gear. The sun wheel of the second planetary gear is an introduction element assigned to the second planetary gear, while the planetary carrier of the second planetary gear is a redirection element of the second planetary gear.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
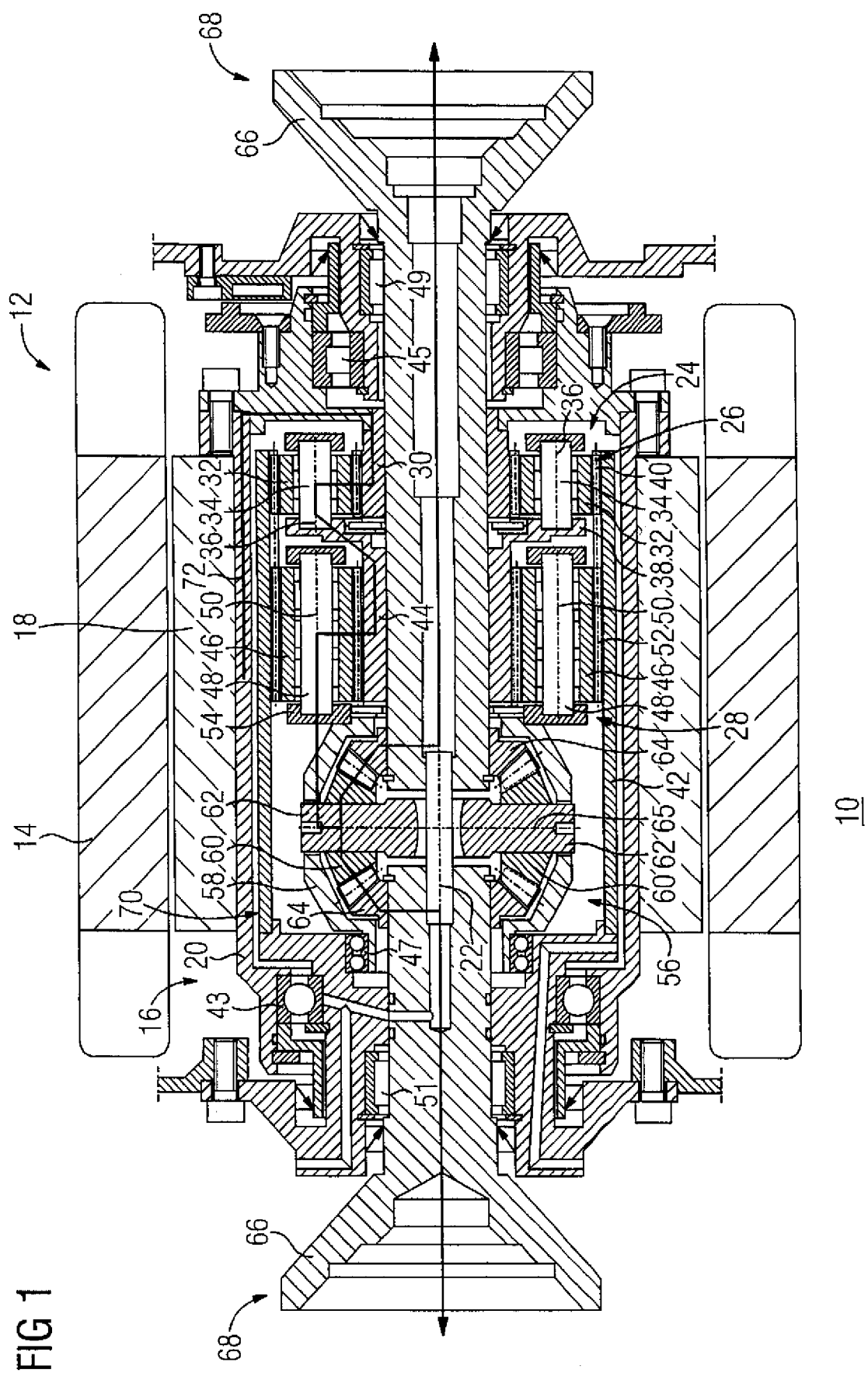
FIG. 1 is a schematic longitudinal section of a drive device for a motor vehicle, depicting one embodiment of a rotor element.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. The features and combinations of features specified in the description as well as the features and combinations of features specified in the description of the figures and/or in the figures alone are able to be used not only in the respectively specified combination, but also in other combinations or on their own, without departing from the framework of the invention.

Turning now to the drawing, and in particular to FIG. 1, there is shown a schematic longitudinal section of a drive device, generally designated by reference numeral 10 for a motor vehicle, which is embodied for example as an automobile. The motor vehicle can also be embodied as a hybrid vehicle or as an electric vehicle, especially with a range extender.

The drive device 10 includes an electric machine 12 having a stator 14, shown schematically only, and a rotor element 16, also shown schematically. The rotor element 16 has an active rotor part 18 with a magnetic circuit comprised of coils and/or magnets as well as a rotor carrier 20, to which the active rotor part 18 is attached. The rotor element 16 is rotatable about an axis of rotation 22.

The drive device 10 additionally includes a transmission device 24, which has, as its first transmission stage, a first planetary gear 26 and, as its second transmission stage, a second planetary gear 28. Of course, at least one of the transmission stages may also be configured in a different way.

The first planetary gear 26 has a first sun wheel 30, which is rotatable about the axis of rotation 22 and coupled with the rotor carrier 20. As a result, torque provided by the electric machine 12, when operating in a motor mode via the rotor carrier 20 for example, is introduced into the first sun wheel 30, so that the first sun wheel 30 is driven by the rotor carrier 20. The first planetary gear 26 has a plurality of first planetary wheel elements 32 in mesh with the first sun wheel 30 via respective teeth. The first planetary gear elements 32 are supported on respective first planetary wheel studs 34 rotatable around an axis of rotation 36 and also via the first planetary wheel studs 34 on a first planetary gear carrier 38 of the first planetary gear 26. The first planetary wheel elements 32 can also rotate about the axis of rotation 22.

Furthermore, the first planetary gear 26 has a first stationary hollow wheel 40, which is integrated into a transmission housing 42 of the transmission device 24. Thus, the transmission housing 42 and the first hollow wheel 40 are embodied in one piece with one another, wherein the first hollow wheel 40 does not rotate about the axis of rotation 22 during operation of the drive device 10. The first planetary wheel elements 32 are hereby in mesh via teeth with the first hollow wheel 40. Of course, the presence of a rotating hollow wheel is also conceivable. In addition, it would be conceivable to support the rotor carrier 20 directly on the hollow wheel outer diameter, for example via a friction bearing, as with turbochargers, or via needle bearings.

The second planetary gear 28 has a second sun wheel 44, which is rotatable about the axis of rotation 22 and coupled or linked to the first planetary carrier 38. As a result, the second sun wheel 44 is driven via the first planetary carrier 38 when the drive device 10 is operated. The second planetary gear 28 also includes a plurality of second planetary wheel elements 46 in mesh via teeth with the second sun wheel 44. The second planetary wheel elements 46 are supported rotatably on respective second planetary wheel studs 48 around respective axes of rotation 50 and can also rotate around the axis of rotation 22.

The second planetary gear 28 has a stationary second hollow wheel 52 in mesh via teeth with the second planetary wheel elements 46 and likewise integrated into the transmission housing 42. A second rotating hollow wheel might also be conceivable. In addition it would be conceivable to support the rotor carrier 20 directly on the hollow wheel outer diameter, for example via a friction bearing, such as with turbochargers, or via needle bearings. The second planetary wheel elements 46 are supported or braced by their second planetary wheel studs 48 on a second planetary carrier 54.

The transmission device 24 additionally includes a differential gear 56 with a so-called differential case 58. The differential gear 56 also has a plurality of balance wheels 60, which are supported rotatably via respective balance studs 62 on the differential case 58 around an axis of rotation 65. Furthermore the differential gear 56 has shaft wheels 64, which are linked via teeth to drive shafts 66 in a torque-proof manner. The drive shafts 66 have respective connections 68, via which driven wheels of the vehicle can be linked in a torque-proof manner to the drive shafts 66.

As can be seen from FIG. 1, the differential gear 56 is embodied as a bevel differential gear, wherein the balance wheels 60 and the shaft wheels 64 are embodied as bevel gears meshing with each other via teeth. The differential gear 56 has four balance wheels 60 for example.

As can also be seen from FIG. 1, the transmission device 24 is not flanged into the rotor element 16 in axial arrangement, but by contrast is integrated into the rotor element 16.

The rotor element 16 delimits an installation area 70 in a radial direction, in which the two-stage transmission device 24 is housed with the differential gear 56. The differential gear 56 and/or the first planetary gear 26 may hereby project in the axial direction beyond the active rotor part 18; however the differential gear 56 does not project beyond the first planetary gear 26 or the rotor carrier 20 in the axial direction, so that the planetary gears 26, 28 and the differential gear 56 are completely accommodated in the installation area 70 and surrounded and covered in the radial direction by the rotor element 16, especially the rotor carrier 20.

This projection beyond the active rotor part 18 by the differential gear 56 and/or the first planetary gear 26 in the axial direction can however be avoided with a different ratio of rotor length/diameter/speed/torque.

This avoids a loss of installation space in an axial direction, since neither the differential gear 56 nor the planetary gear 26, 28 are flanged axially onto the rotor element 16. In addition— as indicated in FIG. 1 by a bold line 72—there is an at least essentially ideal and direct distribution of torque provided by the electric machine 12 in its motor mode via its rotor element 16 at least essentially from the axial center of the rotor element 16 to the two drive shafts 66. The bold line 72 characterizes hereby a flow of force and torque from the electric machine 12 in its motor mode via its rotor element 16 and especially its rotor carrier 25 via the planetary gears 26, 28 and the differential gear 56 to the drive shafts 66. The rotor element 16, the planetary gears 26, 28 and the differential gear 56 are connected in series with one another in relation to the force and/or torque flow (bold line 72).

The first sun wheel 30 functions as first input element of the planetary gear 26, since torque is introduced into the first planetary gear 26 via the first sun wheel 30.

The first planetary carrier 38 functions as first output element of the first planetary gear 26, since torque is derived from the first planetary gear 26 via the first planetary carrier 38.

The second sun wheel 44 linked to the first planetary carrier 38 functions as a second input element of the second planetary gear 28, while the second planetary carrier 54 of the second planetary gear 28 serves as a second output element of the second planetary gear 28 and is linked to the differential gear 56, especially to its differential case 58. In other words, the differential case 58 of the differential gear 56 is driven via the second planetary carrier 54, so that the balance wheels 60, and via these the shaft wheels 64, are rotated around the axis of rotation 22 via the differential case 58. Thus the drive shafts 66 are driven to also rotate about the axis of rotation 22.

Roller bearings 43, 45 are provided to support the rotor element 16. The single-piece, essentially sleeve-shaped rotor carrier 20 is supported on the roller bearing 43 in contact with the latter. In addition a further roller bearing 47 is provided for supporting the differential case 58. The drive shafts 66 are supported by roller bearings 49, 51.

Through the integration of the planetary gears 26, 28 and the differential gear 56 into the rotor element 16 as well as the corresponding configuration of the transmission stages as the planetary gears 26, 28, the drive device 10 requires especially little space and makes possible the efficient and effective transmission and conversion of torque provided by the electric machine 12 through to the drive shafts 66.

Figure 2:
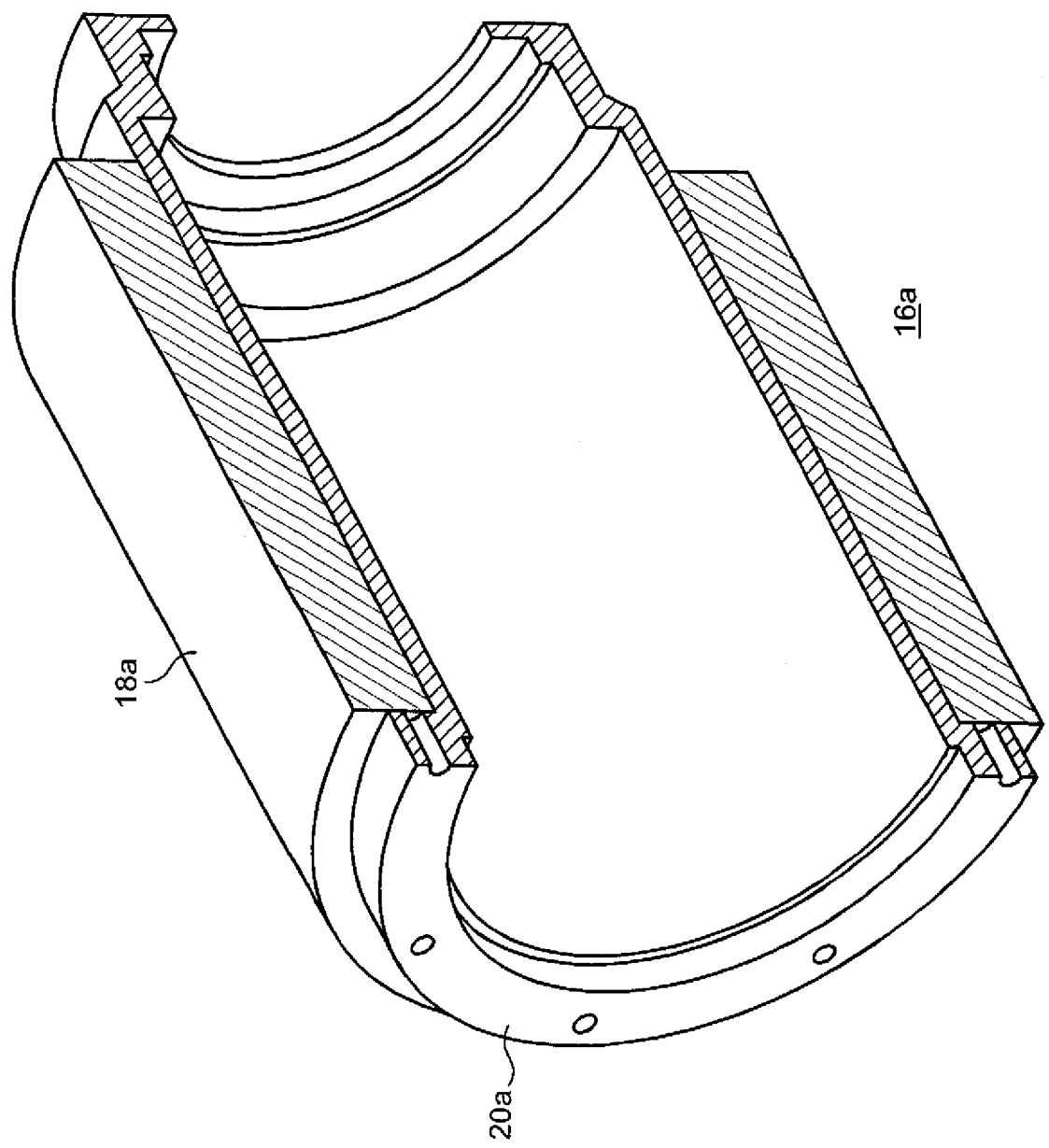
FIG. 2 is a schematic and perspective sectional view of another embodiment of a rotor element for the drive device of FIG. 1.

FIG. 2 shows a further embodiment of a rotor element, generally designated by reference numeral 16a of the electric machine 12. In the following description, parts corresponding with those in FIG. 1 will be identified, where appropriate for the understanding of the invention, by corresponding reference numerals followed by an "a". As can be seen from FIG. 2, the very schematically represented active rotor part 18a is held on a rotor carrier 20a. The rotor carrier 20a is embodied essentially in a sleeve shape and in one piece. In other words, the rotor carrier 20a is made in one piece and configured essentially as a thin-walled tube.

The rotor carrier 20a can be manufactured in a cost-effective way and with thin walls by using an impact extrusion process. As a result of this configuration of the rotor carrier 20a, the need for joints for connecting several rotor carrier parts can be eliminated. As a result, especially little installation space is required, especially in the radial direction of the rotor carrier 20a, and thus of the drive device 10. In particular the presence of radially-projecting joint flanges for connecting a number of rotor carrier parts can be avoided.

The rotor carrier 20a thus has a very delicate structure and is light in weight and can be manufactured without any loss of material. The rotor carrier 20a can be used independently of the functional principle of the electric machine 12. Thus, the electric machine 12 can for example be embodied as a synchronous machine, especially as a permanently-excited machine, as an asynchronous machine or as any other type of electric machine.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A drive device for a motor vehicle, comprising:
   at least one electric machine having at least one rotor element which includes a single-piece, essentially sleeve-shaped rotor carrier to delimit an installation area in a radial direction;
   at least one transmission device disposed, at least partly, in the installation area and configured to be driven by the electric machine via the rotor element, the transmission device including a transmission housing located radially inside of the rotor element and a differential gear having a differential case;
   two drive shafts rotatable by the rotor element through the transmission device and extending in an axial direction; and
   a plurality of roller bearings including
   two roller bearings spaced from each other in the axial direction and directly supporting the drive shafts in the transmission housing in absence of intermediate elements,
   two further roller bearings spaced from each other in the axial direction and directly supporting the rotor carrier on the transmission housing in absence of intermediate elements, and
   an additional roller bearing rotatably supporting one axial end of the differential case on the transmission housing.

2. The drive device of claim 1, wherein the rotor carrier is manufactured by an impact extrusion process.

3. The drive device of claim 1, wherein the rotor element and the transmission device are disposed at least partly coaxially with one another.

4. The drive device of claim 1, wherein the transmission device comprises at least one transmission stage configured to be driven by the electric machine, said differential gear configured to be driven via the transmission stage and the rotor element by the electrical machine.

5. The drive device of claim 1, wherein the transmission device comprises a plurality of transmission stages disposed at least partly in the installation area.

6. The drive device of claim 1, wherein the transmission device comprises a plurality of transmission stages disposed entirely in the installation area.

7. The drive device of claim 1, wherein the transmission device comprises a plurality of transmission stages connected in series with one another to thereby define a first transmission stage and a last transmission stage, said differential gear being configured to be driven via the last transmission stage.

8. The drive device of claim 1, wherein the transmission device comprises a first transmission stage configured as a first planetary gear, and a second transmission stage configured as a second planetary gear which is being driven by the first planetary gear and via which the differential gear is being driven.

9. The drive device of claim 8, wherein the first planetary gear has a sun wheel linked to the rotor carrier of the rotor element, and a planetary carrier linked to a sun wheel of the secondary planetary gear, said second planetary gear having a planetary carrier which is linked to the differential gear.

* * * * *